(12) United States Patent
Ando et al.

(10) Patent No.: US 11,840,959 B2
(45) Date of Patent: Dec. 12, 2023

(54) UNISON RING OF GAS TURBINE ENGINE

(71) Applicant: KAWASAKI JUKOGYO KABUSHIKI KAISHA, Kobe (JP)

(72) Inventors: Takahiro Ando, Kobe (JP); Hirokazu Sasaki, Kobe (JP); Hidetoshi Takemura, Kobe (JP); Nobuhiro Tatematsu, Kobe (JP); Mitsuhiro Kawakatsu, Kobe (JP); Ryosuke Uraguchi, Kobe (JP); Kohei Yuki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/916,287

(22) PCT Filed: Mar. 10, 2021

(86) PCT No.: PCT/JP2021/009626
§ 371 (c)(1),
(2) Date: Sep. 30, 2022

(87) PCT Pub. No.: WO2021/199995
PCT Pub. Date: Oct. 7, 2021

(65) Prior Publication Data
US 2023/0147099 A1    May 11, 2023

(30) Foreign Application Priority Data

Mar. 31, 2020   (JP) .................................. 2020-061796

(51) Int. Cl.
*F01D 17/16*   (2006.01)
*F02C 7/042*   (2006.01)

(52) U.S. Cl.
CPC .......... *F02C 7/042* (2013.01); *F05D 2250/90* (2013.01); *F05D 2300/44* (2013.01); *F05D 2300/6034* (2013.01)

(58) Field of Classification Search
CPC ...... F01D 17/16; F01D 17/162; F01D 17/165; F01D 17/167; F02C 7/042; F05D 2250/90; F05D 2300/6034
See application file for complete search history.

(56) References Cited

U.S. PATENT DOCUMENTS 4,307,994 A  * 12/1981  Brewer ................... F01D 17/16
                                                        415/160
5,700,129 A  * 12/1997  Kocian ................. F01D 17/162
                                                         403/30

(Continued)

FOREIGN PATENT DOCUMENTS

JP    2004-197742 A    7/2004
JP    2007-332970 A    12/2007

(Continued)

OTHER PUBLICATIONS

International Search Report for PCT/JP2021/009626 dated, Apr. 20, 2021 (PCT/ISA/210).

*Primary Examiner* — David E Sosnowski
*Assistant Examiner* — Maxime M Adjagbe
(74) *Attorney, Agent, or Firm* — Sughrue Mion, PLLC

(57) ABSTRACT

A unison ring of a gas turbine engine includes: an annular body including fiber-reinforced resin or circular-arc bodies including the fiber-reinforced resin, the fiber-reinforced resin including resin and reinforced fibers; and pin holes in which a pin is in a radial direction orthogonal to an axial direction of the unison ring. A main orientation of the reinforced fibers of the fiber-reinforced resin is directed in a circumferential direction of the unison ring.

6 Claims, 8 Drawing Sheets

(56) References Cited

U.S. PATENT DOCUMENTS

| | | | |
|---|---|---|---|
| 7,198,461 B2* | 4/2007 | Burgmeier | F01D 17/162 |
| | | | 415/160 |
| 2004/0115045 A1 | 6/2004 | Alexander et al. | |
| 2006/0245676 A1* | 11/2006 | Bruce | F16C 11/0614 |
| | | | 384/192 |
| 2007/0292264 A1 | 12/2007 | Bouru | |
| 2009/0074569 A1 | 3/2009 | Garcin et al. | |
| 2010/0150706 A1 | 6/2010 | Xie et al. | |
| 2010/0202873 A1* | 8/2010 | Andrew | F01D 17/162 |
| | | | 415/200 |
| 2012/0076641 A1 | 3/2012 | Jarrett, Jr. et al. | |
| 2014/0064910 A1 | 3/2014 | Velampati et al. | |
| 2015/0252680 A1 | 9/2015 | Leblanc | |
| 2016/0290361 A1 | 10/2016 | Ikeguchi et al. | |

FOREIGN PATENT DOCUMENTS

| | | |
|---|---|---|
| JP | 2009-068491 A | 4/2009 |
| JP | 2010-531404 A | 9/2010 |
| JP | 2012-072763 A | 4/2012 |
| JP | 2014-047783 A | 3/2014 |
| WO | 2015/093243 A1 | 6/2015 |

* cited by examiner

UNISON RING OF GAS TURBINE ENGINE

CROSS REFERENCE TO RELATED APPLICATIONS

This application is a National Stage of International Application No. PCT/JP2021/009626 filed Mar. 10, 2021, claiming priority based on Japanese Patent Application No. 2020-061796 filed Mar. 31, 2020.

TECHNICAL FIELD

The present disclosure relates to a unison ring which is located along an outer periphery of a casing of a gas turbine engine including a compressor, a combustor, and a turbine and is coupled to variable stator vanes of the compressor.

BACKGROUND ART

A gas turbine engine includes a compressor, a combustor, and a turbine which are lined up along a rotating shaft in a casing (see PTL 1, for example). The compressor includes: moving vanes connected to the rotating shaft; and variable stator vanes connected to the casing. A rotating shaft portion of the variable stator vane projects outside the casing. A unison ring is located at an outer periphery side of the casing. A pin in a pin hole of the unison ring is coupled to the rotating shaft portion of the variable stator vane through a lever. When the unison ring is rotated by an actuator along an outer peripheral surface of the casing by a desired angle, this rotation is transmitted through the lever to the rotating shaft portion of the variable stator vane, and this changes an angle of the variable stator vane.

CITATION LIST

Patent Literature

PTL 1: Japanese Laid-Open Patent Application Publication No. 2014-47783

SUMMARY OF INVENTION

Technical Problem

When rotating the unison ring by the actuator, pressure received by the variable stator vane from compressed air in the compressor is applied as reaction force to the unison ring through the lever. Therefore, bending stress and torsional stress are generated in the unison ring, and this may deform the unison ring. When the unison ring is deformed, the angle of the variable stator vane deviates from a target angle. When there is an error in the angle of the variable stator vane, the operation of the compressor becomes unstable, and the deterioration of the efficiency of the compressor may occur.

An object of the present disclosure is to devise a unison ring to prevent deteriorations of operation stability and efficiency of a compressor of a gas turbine engine.

Solution to Problem

A unison ring of a gas turbine engine according to one aspect of the present disclosure is a unison ring of a gas turbine engine including a compressor, a combustor, and a turbine. The unison ring is located along an outer periphery of a casing of the gas turbine engine and coupled to variable stator vanes of the compressor. The unison ring includes: an annular body including fiber-reinforced resin or circular-arc bodies including the fiber-reinforced resin, the fiber-reinforced resin including resin and reinforced fibers; and pin holes in which a pin is in a radial direction orthogonal to an axial direction of the unison ring. A main orientation of the reinforced fibers of the fiber-reinforced resin is directed in a circumferential direction of the unison ring.

According to the above configuration, the unison ring includes the fiber-reinforced resin, and the main orientation of the reinforced fibers is directed in the circumferential direction of the unison ring. Therefore, the bending rigidity of the unison ring can be improved while reducing the weight of the unison ring. On this account, the error of the angle of the variable stator vane can be reduced, and the deteriorations of the operation stability and efficiency of the compressor of the gas turbine engine can be prevented.

Advantageous Effects of Invention

The present disclosure can improve the rigidity of the unison ring and prevent the deteriorations of the operation stability and efficiency of the compressor of the gas turbine engine.

DESCRIPTION OF EMBODIMENTS

Hereinafter, an embodiment will be described with reference to the drawings.

Figure 1:
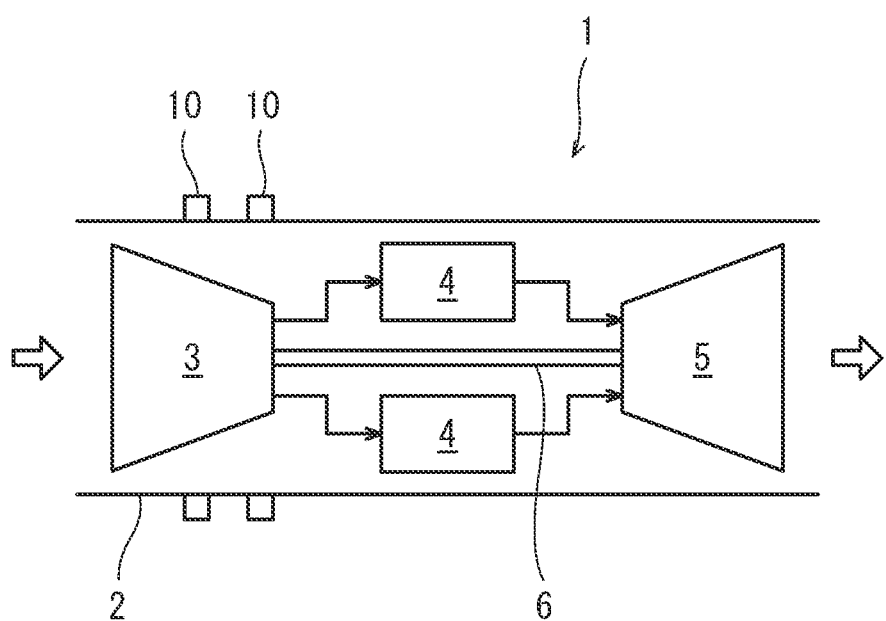
FIG. 1 is a schematic diagram showing a gas turbine according to an embodiment.

FIG. 1 is a schematic diagram showing a gas turbine according to the embodiment. As shown in FIG. 1, a gas turbine engine 1 includes a casing 2. The casing 2 houses a compressor 3, a combustor 4, and a turbine 5. The compressor 3 and the turbine 5 are coupled to each other through a rotating shaft 6. The compressor 3 rotates in association with the turbine 5 to compress air and supplies the compressed air to the combustor 4. A combustion gas ejected from the combustor 4 rotates the turbine 5 and is discharged to an outside. The gas turbine engine 1 may be utilized as an aircraft engine.

The compressor 3 includes plural pairs of moving vane rows and stator vane rows. At least one of the stator vane rows of the compressor 3 includes variable stator vanes 11 (see FIG. 5) lined up in a circumferential direction of the casing 2 such that angles of attack of the variable stator vanes 11 are adjustable. Unison rings 10 are externally fitted to the casing 2 so as to be lined up in an axial direction of the gas turbine engine 1. The unison rings 10 are rotatable relative to an outer peripheral surface of the casing 2 in the circumferential direction. When the unison rings 10 are angularly displaced in the the circumferential direction (rotational direction) along the outer peripheral surface of the casing 2, the angles of attack of the variable stator vanes 11 change.

Figure 2:
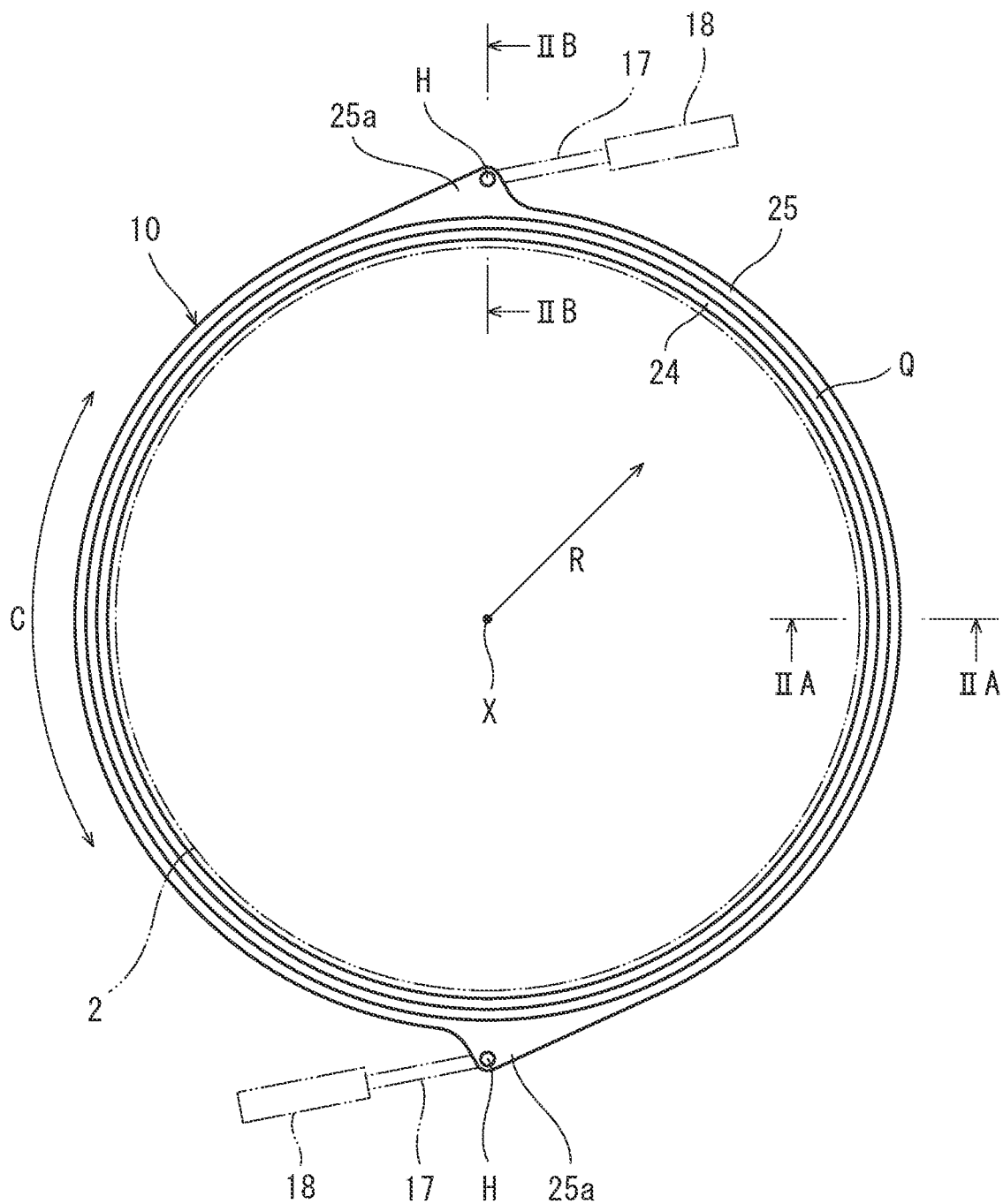
FIG. 2 is a front view of a unison ring of the gas turbine engine shown in FIG. 1.
Figure 3A:
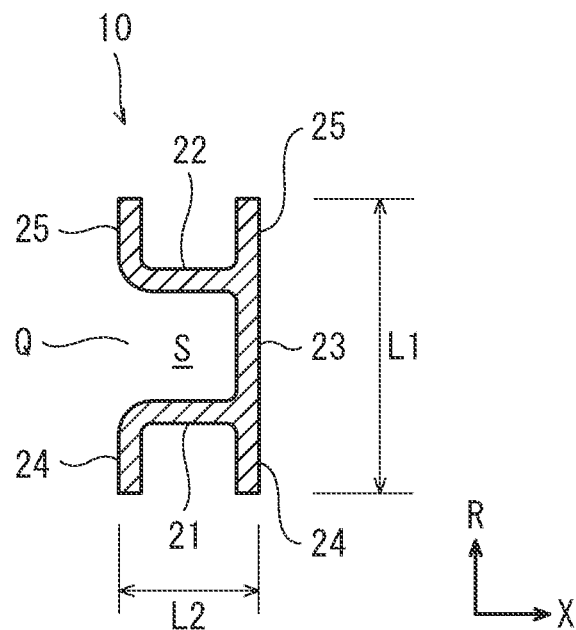
FIG. 3A is a sectional view taken along line of FIG. 2.
Figure 3B:
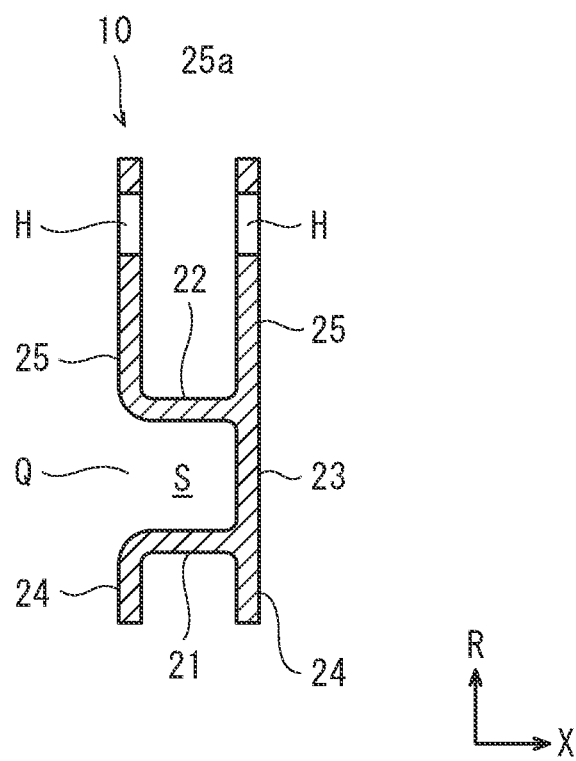
FIG. 3B is a sectional view taken along line IIB-IIB of FIG. 2.
Figure 4:
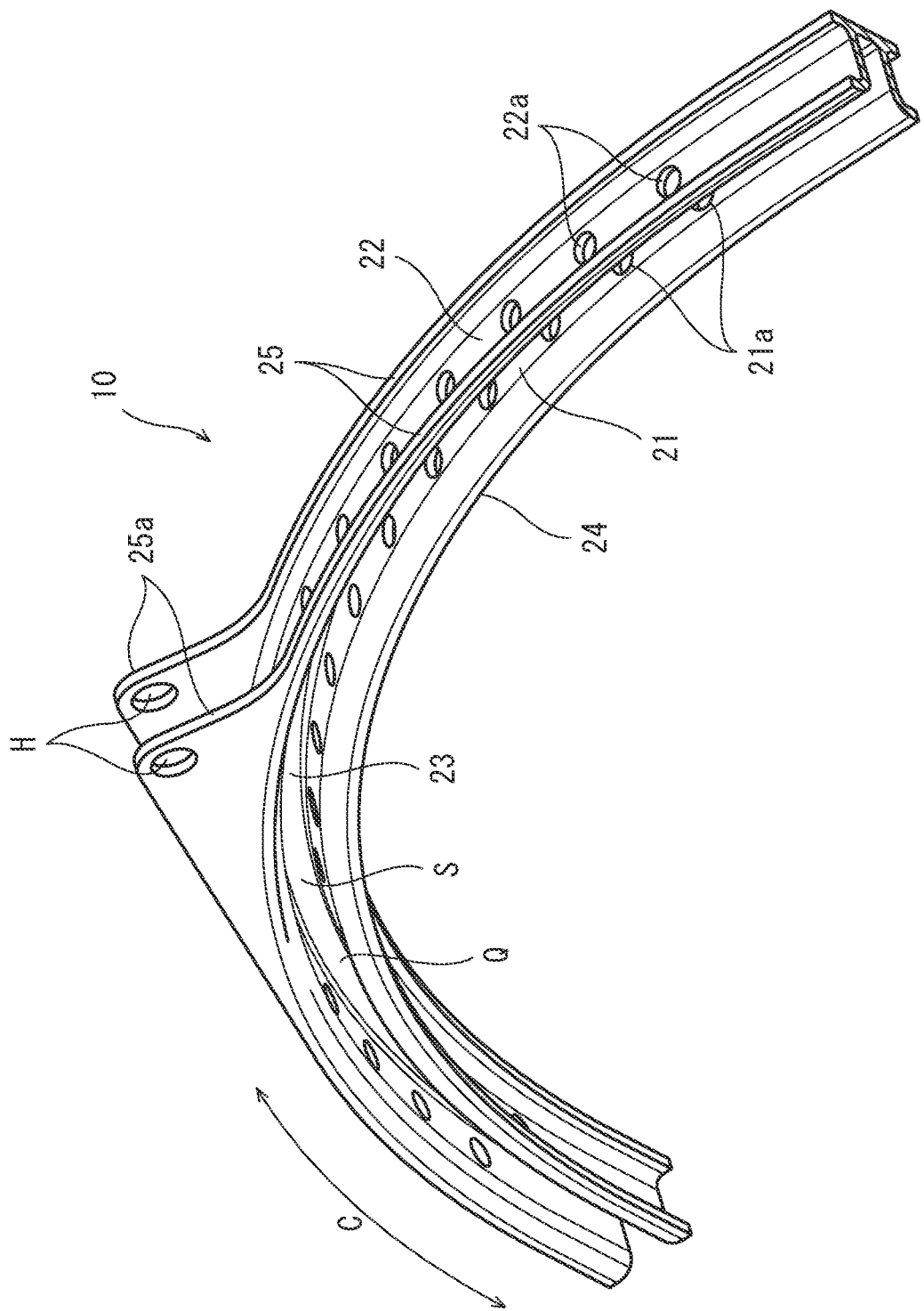
FIG. 4 is a partial perspective view of the unison ring shown in FIG. 2.

FIG. 2 is a front view of the unison ring 10 of the gas turbine engine 1 shown in FIG. 1. FIG. 3A is a sectional view taken along line IIA-IIA of FIG. 2. FIG. 3B is a sectional view taken along line of FIG. 2. FIG. 4 is a partial perspective view of the unison ring 10 shown in FIG. 2. As shown in FIGS. 2 to 4, the unison ring 10 is an annular body made of fiber-reinforced resin by integral molding. The unison ring 10 may include separate circular-arc bodies located circumferentially and have a practically annular shape as a whole.

An axis X of the unison ring 10 passes through a center of the unison ring 10 and is orthogonal to a radial direction R of the unison ring 10. A direction (hereinafter referred to as an "axial direction X") in which the axis X of the unison ring 10 extends is a direction orthogonal to the radial direction R of the unison ring 10. A circumferential direction C of the unison ring 10 is a direction along an outer peripheral surface of the unison ring 10. To be specific, when viewed in the axial direction X, the circumferential direction C of the unison ring 10 is a direction along a circle whose center is the axis X of the unison ring 10.

Regarding a section (section including the axis X of the unison ring 10) of the unison ring 10 orthogonal to the circumferential direction C, the unison ring 10 may adopt various sectional shapes. As one example, the unison ring 10 includes an inner plate 21, an outer plate 22, a coupling plate 23, a pair of inner flange plates 24, and a pair of outer flange plates 25. Each of the inner plate 21 and the outer plate 22 has a cylindrical shape including main surfaces facing the radial direction R. The outer plate 22 is located concentrically with the inner plate 21 and away from the inner plate 21 outward in the radial direction R. The inner plate 21 includes pin holes 21a located at intervals in the circumferential direction, and the outer plate 22 includes pin holes 22a located at intervals in the circumferential direction. The pin holes 21a of the inner plate 21 and the pin holes 22a of the outer plate 22 coincide with each other when viewed in the radial direction R.

The coupling plate 23 has an annular flat plate shape including main surfaces facing the axial direction X. The coupling plate 23 couples one end of the inner plate 21 in the axial direction X to one end of the outer plate 22 in the axial direction X. An intermediate space S between the inner plate 21 and the outer plate 22 is open toward a side in the axial direction X which is opposite to a side at which the coupling plate 23 is. In other words, the unison ring 10 includes an opening Q between the other end of the inner plate 21 in the axial direction X and the other end of the outer plate 22 in the axial direction X.

Each of the pair of inner flange plates 24 has an annular flat plate shape including main surfaces facing the axial direction X. The pair of inner flange plates 24 are located away from each other in the axial direction X. The pair of inner flange plates 24 project inward in the radial direction R from both ends of the inner plate 21 in the axial direction X, respectively. Each of the pair of outer flange plates 25 has an annular flat plate shape including main surfaces facing the axial direction X. The pair of outer flange plates 25 are located away from each other in the axial direction X. The pair of outer flange plates 25 project outward in the radial direction R from both ends of the outer plate 22 in the axial direction X, respectively.

Each of the pair of outer flange plates 25 includes a support 25a partially projecting in the radial direction R. The support 25a is integrally molded as a part of the outer flange plate 25. The support 25a includes a support hole H penetrating in the axial direction X. The support 25a is a portion to which driving power of a below-described actuator 18 is input to angularly displace the unison ring 10 relative to the casing 2 around the axis X.

In the present embodiment, the section of the unison ring 10 orthogonal to the circumferential direction C has a π shape when the axial direction X is set to an upper-lower direction. The section of the unison ring 10 orthogonal to the circumferential direction C has such a shape that a dimension L1 of the unison ring 10 in the radial direction R is larger than a dimension L2 of the unison ring 10 in the axial direction X regardless of the position of the section in the circumferential direction C, 1b be specific, "L1>L2" is satisfied in not only the section shown in FIG. 3B but also the section shown in FIG. 3A.

As described above, the unison ring 10 is made of fiber-reinforced resin containing resin and reinforced fibers. The resin is a resin material selected from bismaleimide, epoxy, polyimide, and the like. The reinforced fibers are fibrous materials selected from carbon fibers, glass fibers, aramid fibers, and the like. The unison ring 10 is manufactured by laminating prepregs and subjecting the prepregs to pressing. The prepregs are prepared by impregnating reinforced fiber sheets with the resin.

The reinforced fiber sheets include, for example, a sheet made of a UD material in which reinforced fibers are oriented in one direction and a sheet made of a fabric material in which reinforced fibers are oriented in two directions. The orientation of the UD material extends in the circumferential direction C of the unison ring 10. One of the orientations of the fabric material extends in the circumferential direction C of the unison ring 10. For example, a ratio of the reinforced fibers extending in the circumferential direction C of the unison ring 10 to all the reinforced fibers of the fabric material may be 50% or more.

The most common orientations among all the orientations of the reinforced fibers in the entire unison ring 10 extend in the circumferential direction C of the unison ring 10. To be specific, a main orientation of the reinforced fibers of the fiber-reinforced resin is directed in the circumferential direction C of the unison ring 10.

The reinforced fiber sheets include first reinforced fiber sheets, second reinforced fiber sheet, and third reinforced fiber sheets. Two sheets among the first to third reinforced fiber sheets are partially laminated on each other. In the section of the unison ring 10 orthogonal to the circumferential direction C, the first to third reinforced fiber sheets are located so as to partially extend in different directions.

Therefore, there is a gap surrounded by the first to third reinforced fiber sheets. A reinforced fiber filler impregnated with the resin is in the gap. Therefore, the decrease in strength due to the gap is prevented. For example, a reinforced fiber sheet rounded in a tubular shape may be used as the reinforced fiber filler. It is preferable that the main orientation of the reinforced fibers of the reinforced fiber filler be directed in the circumferential direction C of the unison ring 10.

Figure 5:
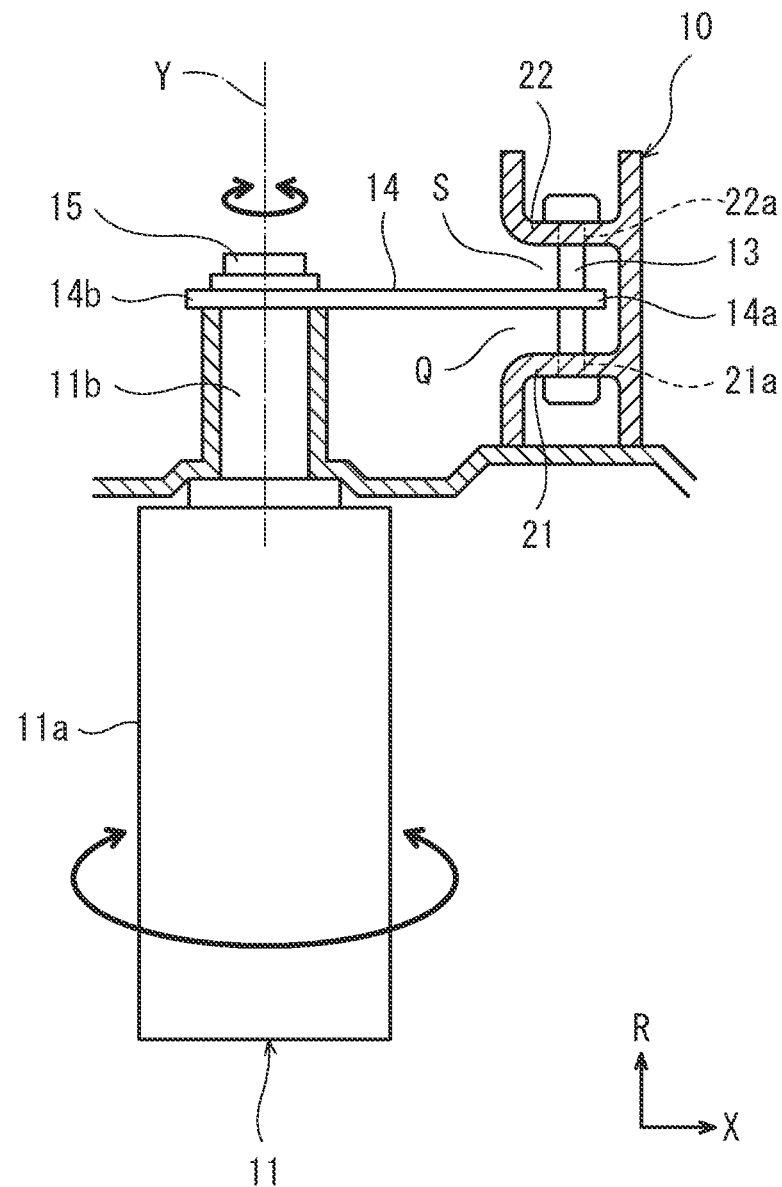
FIG. 5 is a sectional view of major components of the gas turbine engine to which the unison ring shown in FIG. 2 is applied.

FIG. 5 is a sectional view showing major components of the gas turbine engine 1 to which the unison ring 10 shown in FIG. 2 is applied. As shown in FIG. 5, a pin 13 is in the pin holes 21a and 22a of the inner and outer plates 21 and 22 of the unison ring 10 in the radial direction R in a state where the pin 13 is prevented from coming out. The pin 13 is in a first end portion 14a of a lever 14 so as to be rotatable. The first end portion 14a of the lever 14 is in connection with the pin 13 in the intermediate space S of the unison ring 10 so as to be rotatable and extends through the opening Q of the unison ring 10 in the axial direction X to an outside of the intermediate space S.

The variable stator vane 11 includes a stator vane main body 11a and a shaft 11b. The stator vane main body 11a is a blade that contacts and rectifies a fluid in the compressor 3. The shaft 1b projects from the stator vane main body 11a outward in the radial direction R to an outside of the casing 2. A second end portion 14b of the lever 14 is fixed to the shaft 11b of the variable stator vane 11 by a fastener 15 so as not to be rotatable. A rotation axis Y of the variable stator vane 11 is an axis of the shaft 11b. When the first end portion 14a of the lever 14 is displaced in the circumferential direction C, the second end portion 14b of the lever 14 angularly displaces the variable stator vane 11 around the axis Y.

Figure 6:
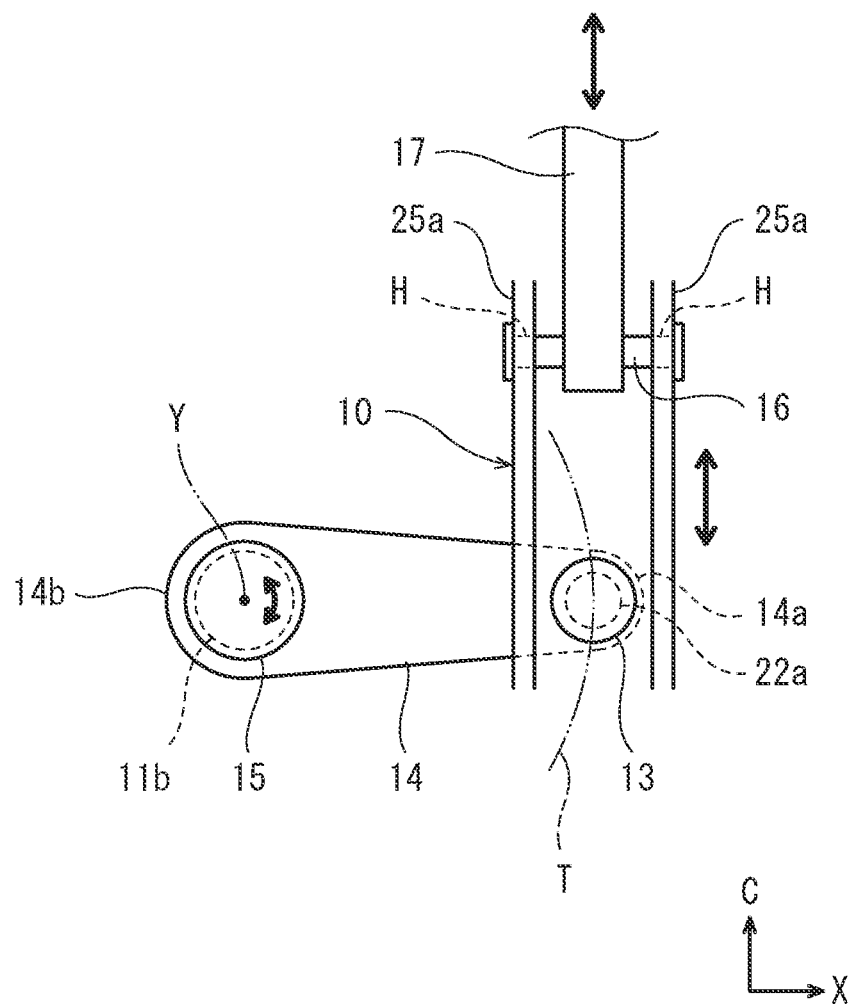
FIG. 6 is a diagram for explaining an operation trajectory of a pin hole of the unison ring when the unison ring and the like shown in FIG. 5 are viewed from an outside in a radial direction.

FIG. 6 is a diagram for explaining an operation trajectory T of the pin hole 22a of the unison ring 10 when the unison ring 10 and the like shown in FIG. 5 are viewed from an outside in the radial direction R. As shown in FIG. 6, both end portions of a pin 16 are in the support holes H (also see FIG. 2) of the pair of outer flange plates 25 in a state where the pin 16 is prevented from coming out. The pin 16 is in a tip portion of a rod 17 so as to be rotatable. The rod 17 is driven by the actuator 18 so as to advance or retreat in the circumferential direction C along the outer peripheral surface of the unison ring 10. For simplicity, FIG. 2 shows that the actuator 18 is in direct connection with the rod 17. However, as in PTL 1, a crank structure (not shown) and the like may be located between the actuator 18 and the rod 17.

When the rod 17 advances or retreats by the driving power of the actuator 18, the unison ring 10 is angularly displaced in the circumferential direction C around the axis X. With this, the pin 13 moves in the circumferential direction C, the lever 14 turns around the axis Y, and the variable stator vane 11 is angularly displaced around the axis Y. At this time, the driving power of the actuator 18 is input to the supports 25a of the unison ring 10. Thus, a load is input to a part of the unison ring 10 in the circumferential direction C (FIG. 2 shows two load input portions (supports 25a)). Therefore, stress that causes bending deformation in the radial direction R is generated in the unison ring 10.

Moreover, since the lever 14 has a fixed length, the pin 13 and the pin hole 22a move on the trajectory T having a circular-arc shape about the axis Y of the variable stator vane 11. Therefore, in accordance with the advancing or retreating of the rod 17, the unison ring 10 moves in the circumferential direction C and also moves slightly in the axial direction X. In this case, an advance-retreat direction of the rod 17 slightly deviates from the circumferential direction C of the unison ring 10. Therefore, stress that causes torsional deformation around the circumferential direction C is generated in the unison ring 10.

The sectional shape of the unison ring 10 is not limited to the above, and various sectional shapes may be adopted.

Figure 7A:
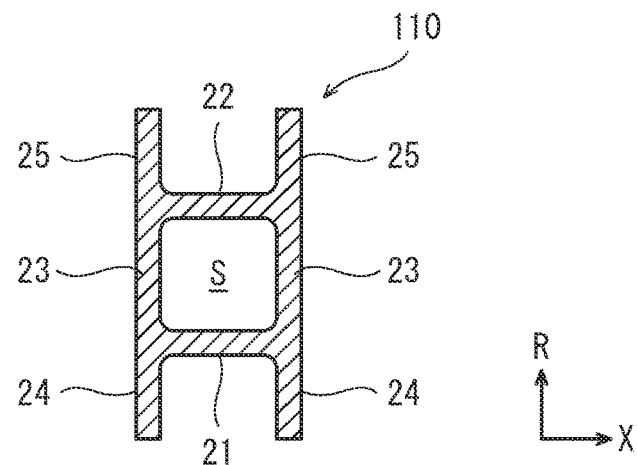
FIG. 7A is a sectional view of the unison ring of Modified Example 1.
Figure 7B:
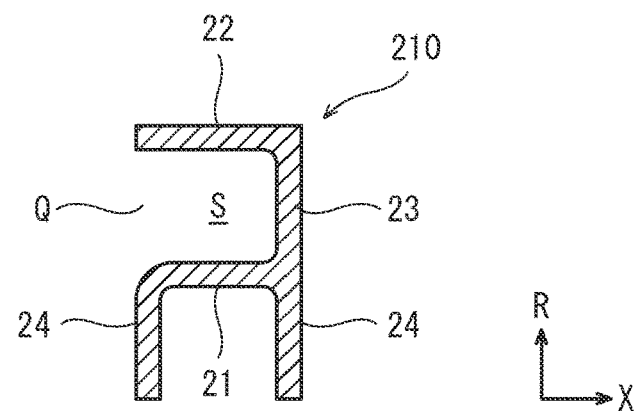
FIG. 7B is a sectional view of the unison ring of Modified Example 2.
Figure 7C:
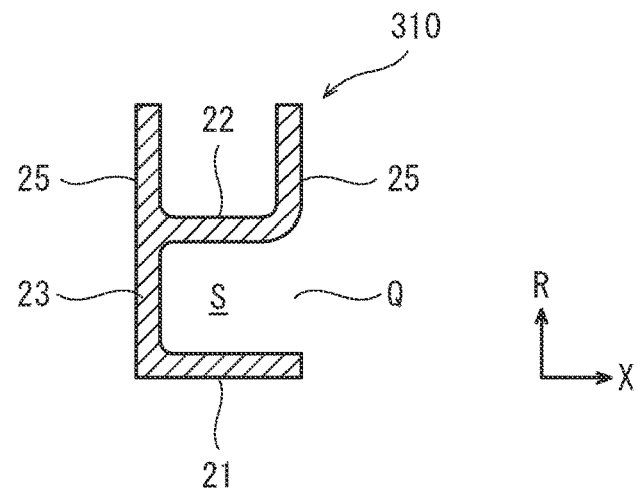
FIG. 7C is a sectional view of the unison ring of Modified Example 3.

FIG. 7A is a sectional view of a unison ring 110 of Modified Example 1. FIG. 7B is a sectional view of a unison ring 210 of Modified Example 2. FIG. 7C is a sectional view of a unison ring 310 of Modified Example 3. The same reference signs are used for components common to the components of the unison ring 10, and the repetition of the same explanation is avoided.

As shown in FIG. 7A, unlike the unison ring 10 shown in FIG. 3A, the unison ring 110 of Modified Example 1 does not include the opening Q that opens the intermediate space S between the inner plate 21 and the outer plate 22. To be specific, in the unison ring 110, one of the pair of coupling plates 23 couples one end of the inner plate 21 in the axial direction X to one end of the outer plate 22 in the axial direction X, and the other of the pair of coupling plates 23 couples the other end of the inner plate 21 in the axial direction X to the other end of the outer plate 22 in the axial direction X. Since the other components are the same as those of the unison ring 10, explanations thereof are omitted.

As shown in FIG. 7B, the unison ring 210 of Modified Example 2 does not include the outer flange plates 25. It is preferable that a dimension of the unison ring 210 in the radial direction R be larger than a dimension of the unison ring 210 in the axial direction X. Since the other components are the same as those of the unison ring 10, explanations thereof are omitted.

As shown in FIG. 7C, the unison ring 310 of Modified Example 3 does not include the inner flange plates 24. It is preferable that a dimension of the unison ring 310 in the radial direction R be larger than a dimension of the unison ring 310 in the axial direction X. Since the other components are the same as those of the unison ring 10, explanations thereof are omitted.

Next, differences of bending rigidity and torsional rigidity between the unison rings having different sectional shapes will be discussed. Calculation results of bending rigidity values and torsional rigidity values of the unison rings having different sectional shapes were obtained by using computer simulation. In the present simulation, "Inspire" that is software produced by Altair Engineering was used. In the present simulation, conditions other than the sectional shape are set to be the same among the unison rings.

Figure 8:
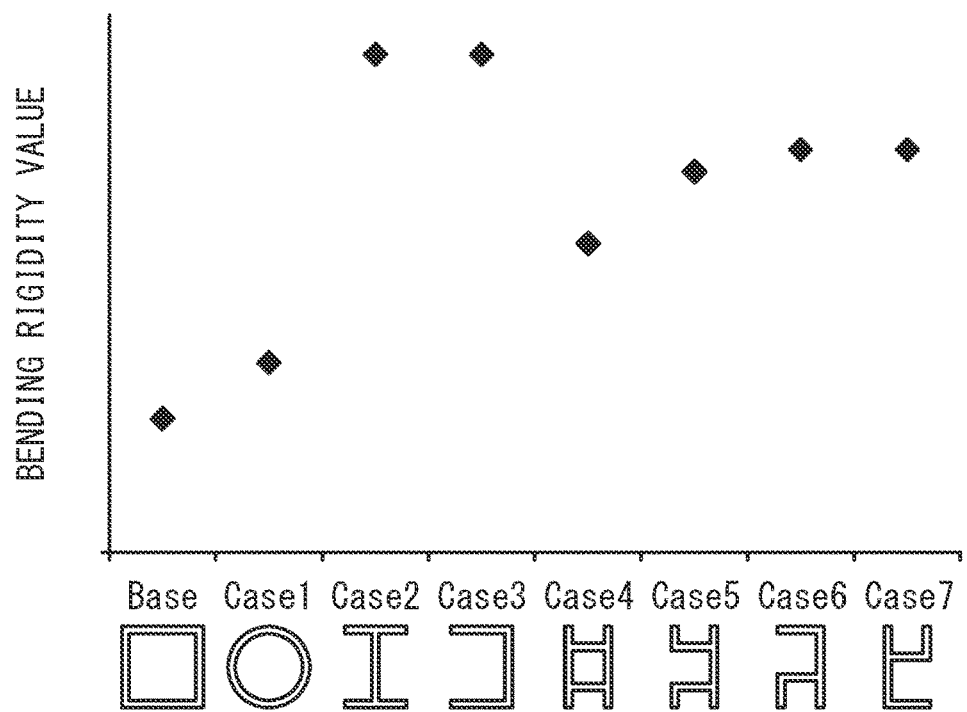
FIG. 8 is a graph showing bending rigidity values of the unison rings having respective sectional shapes.
Figure 9:
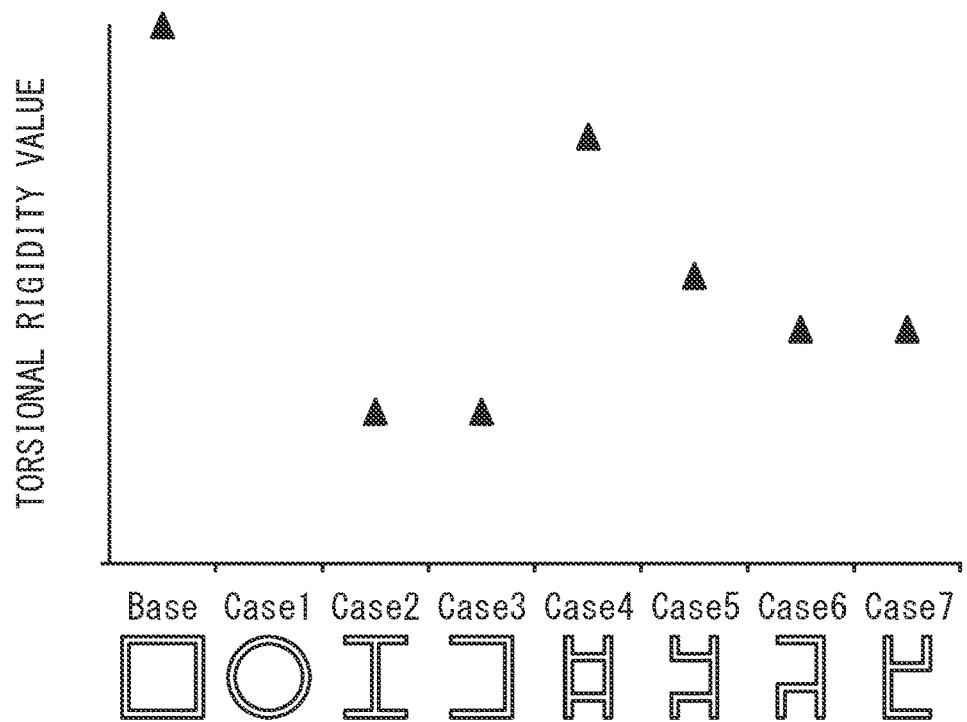
FIG. 9 is a graph showing torsional rigidity values of the unison rings having the respective sectional shapes.

FIG. 8 is a graph showing the bending rigidity values of the unison rings having the respective sectional shapes, FIG. 9 is a graph showing the torsional rigidity values of the unison rings having the respective sectional shapes. The sectional shape of "Base" is a rectangular shape that is the sectional shape of a conventional unison ring. The sectional shape of "Case 1" is an annular shape. The sectional shape of "Case 2" is an I shape. The sectional shape of "Case 3" is a horseshoe shape. The sectional shape of "Case 4" is the sectional shape shown in FIG. 7A. The sectional shape of "Case 5" is the sectional shape shown in FIG. 3A. The sectional shape of "Case 6" is the sectional shape shown in FIG. 7B. The sectional shape of "Case 7" is the sectional shape of FIG. 7C. Each of vertical axes of the graphs of FIGS. 8 and 9 denotes a relative value based on a value of the sectional shape of Base.

It is clear from FIG. 8 that the bending rigidity of the unison ring in each of Cases 2 to 7 is superior to the bending rigidity of the unison ring in each of Base and Case 1. Moreover, it is clear from FIG. 9 that the torsional rigidity of the unison ring in each of Base and Cases 4 to 7 is superior to the torsional rigidity of the unison ring in each of Cases 2 and 3. Therefore, it is clear that both the bending rigidity and torsional rigidity of the unison ring in each of Cases 4 to 7 are superior.

According to the above configuration, the unison ring 10 includes the fiber-reinforced resin, and the main orientation of the reinforced fibers is directed in the circumferential direction C of the unison ring 10. Therefore, the bending rigidity of the unison ring 10 can be improved while reducing the weight of the unison ring 10. On this account, the error of the angle of the variable stator vane 11 can be reduced, and the deteriorations of the operation stability and efficiency of the compressor 3 of the gas turbine engine 1 can be prevented.

Moreover, the section of the unison ring 10 orthogonal to the circumferential direction C has such a shape that the dimension L1 of the unison ring 10 in the radial direction R is larger than the dimension L2 of the unison ring 10 in the axial direction X. Therefore, the bending rigidity of the unison ring 10 in the radial direction R can be further improved.

Moreover, the torsional rigidity can be improved by the flange plate portions 24 and 25 while reducing the weight and improving the bending rigidity by the coupling plate 23. Furthermore, the intermediate space S between the inner plate 21 and the outer plate 22 is open toward a side in the axial direction X which is opposite to a side at which the coupling plate 23 is. Therefore, the lever 14 coupled to the variable stator vane 11 can be connected to the pin 13 in the intermediate space S between the inner plate 21 and the outer plate 22. Thus, the degree of freedom of the layout can be improved.

Moreover, the resin used in the unison ring 10 is selected from bismaleimide, epoxy, polyimide, and the like, and the reinforced fibers used in the unison ring 10 are selected from carbon fibers, glass fibers, aramid fibers, and the like. Therefore, the unison ring 10 having high specific strength and high heat resistance can be realized.

The present disclosure is not limited to the above embodiment. Modifications, additions, and eliminations may be made with respect to the configuration of the embodiment. The sectional shape of the unison ring may be any shape as long as the unison ring is made of the fiber-reinforced resin, and the main orientation of the reinforced fibers is directed in the circumferential direction of the unison ring. For example, the sectional shape of the unison ring may be any of the shapes shown in FIGS. 8 and 9. The unison ring does not have to include the inner flange plates 24 and the outer flange plates 25. When the unison ring does not include the inner flange plates 24 and the outer flange plates 25, the lever 14 may be in connection with the pin 13 at an outside of the outer plate 22 in the radial direction R, or the lever 14 may be in connection with the pin 13 at an inside of the inner plate 21 in the radial direction R. The section of the unison ring 10 orthogonal to the circumferential direction C may have such a shape that the dimension of the unison ring 10 in the radial direction R is smaller than the dimension of the unison ring 10 in the axial direction X.

The invention claimed is:

1. A unison ring of a gas turbine engine including a compressor, a combustor, and a turbine, the unison ring being located along an outer periphery of a casing of the gas turbine engine and coupled to variable stator vanes of the compressor, the unison ring comprising:

an annular body including fiber-reinforced resin or circular-arc bodies including the fiber-reinforced resin, the fiber-reinforced resin including resin and reinforced fibers; and pin holes in which a pin is in a radial direction orthogonal to an axial direction of the unison ring, wherein a main orientation of the reinforced fibers of the fiber-reinforced resin is directed in a circumferential direction of the unison ring, the unison ring further comprises:

an inner plate including a first pin hole of the pin holes and main surfaces facing the radial direction;

an outer plate including a second pin hole of the pin holes and main surfaces facing the radial direction, the inner plate and the outer plate being located concentrically;

a coupling plate including main surfaces facing the axial direction, the coupling plate coupling the inner plate to the outer plate; and at least one flange plate portion including main surfaces facing the axial direction, the at least one flange plate projecting in the radial direction from at least one of an end of the inner plate in the axial direction or an end of the outer plate in the axial direction, and the at least one flange plate portion comprises a pair of inner flange plates projecting inward in the radial direction from both ends of the inner plate in the axial direction.

2. The unison ring according to claim 1, wherein a section of the unison ring orthogonal to the circumferential direction has such a shape that a dimension of the unison ring in the radial direction is larger than a dimension of the unison ring in the axial direction.

3. The unison ring according to claim 1, wherein the at least one flange plate portion comprises a pair of outer flange plates projecting outward in the radial direction from both ends of the outer plate in the axial direction.

4. The unison ring according to claim 1, wherein:

the coupling plate couples one end of the inner plate in the axial direction to one end of the outer plate in the axial direction; and a space between the inner plate and the outer plate is open toward a side in the axial direction which is opposite to a side at which the coupling plate is.

5. The unison ring according to claim 1, wherein a section of the unison ring orthogonal to the circumferential direction has a π shape.

6. The unison ring according to claim 1, wherein:

the resin is selected from bismaleimide, epoxy, and polyimide; and the reinforced fibers are selected from carbon fibers, glass fibers, and aramid fibers.

* * * * *